(12) United States Patent
Liu

(10) Patent No.: US 10,834,701 B2
(45) Date of Patent: Nov. 10, 2020

(54) PAGING PROCESSING METHOD AND APPARATUS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/606,768

(22) PCT Filed: Apr. 20, 2017

(86) PCT No.: PCT/CN2017/081245
§ 371 (c)(1),
(2) Date: Oct. 20, 2019

(87) PCT Pub. No.: WO2018/191912
PCT Pub. Date: Oct. 25, 2018

(65) Prior Publication Data
US 2020/0137717 A1     Apr. 30, 2020

(51) Int. Cl.
*H04W 4/70*        (2018.01)
*H04W 68/02*       (2009.01)
*H04W 28/02*       (2009.01)
*H04W 76/28*       (2018.01)

(52) U.S. Cl.
CPC ............ *H04W 68/02* (2013.01); *H04W 4/70* (2018.02); *H04W 28/0289* (2013.01); *H04W 76/28* (2018.02)

(58) Field of Classification Search
CPC ....... H04W 68/00; H04W 68/02; H04W 4/70; H04W 76/28
See application file for complete search history.

(56) References Cited

U.S. PATENT DOCUMENTS

| 2012/0063413 | A1* | 3/2012 | Kroener | H04W 72/12 370/330 |
| 2012/0202543 | A1* | 8/2012 | Murias | H04W 4/70 455/509 |
| 2013/0210467 | A1* | 8/2013 | Kim | H04W 68/02 455/458 |

(Continued)

FOREIGN PATENT DOCUMENTS

| CN | 101268713 A | 9/2008 |
| CN | 102158959 A | 8/2011 |

(Continued)

OTHER PUBLICATIONS

CN Second Office Action in Application No. 201780000253.0, dated Sep. 3, 2020.

*Primary Examiner* — Jinsong Hu
*Assistant Examiner* — Farideh Madani
(74) *Attorney, Agent, or Firm* — Syncoda LLC; Feng Ma

(57) ABSTRACT

A paging processing method applied to a Machine-Type Communication (MTC) terminal includes: determining a time-delay value of delaying a paging response according to a paging indication sent by a network side, the paging indication being indicative of presence of a paging to the MTC terminal; determining a target time point for performing the paging response according to the time-delay value; and performing the paging response at the target time point.

7 Claims, 13 Drawing Sheets

(56) References Cited

U.S. PATENT DOCUMENTS

| | | | |
|---|---|---|---|
| 2015/0304987 A1 | 10/2015 | Jin | |
| 2016/0081022 A1* | 3/2016 | Haneji | H04W 52/0229 |
| | | | 370/311 |
| 2016/0088610 A1 | 3/2016 | Abraham et al. | |
| 2018/0176847 A1* | 6/2018 | Fasil Abdul | H04W 72/085 |
| 2018/0288680 A1* | 10/2018 | Yamada | H04W 48/06 |

FOREIGN PATENT DOCUMENTS

| | | | | |
|---|---|---|---|---|
| CN | 102170659 A | 8/2011 | | |
| CN | 102378305 A | 3/2012 | | |
| CN | 102572782 A | 7/2012 | | |
| CN | 102740487 A | 10/2012 | | |
| CN | 102835176 A | 12/2012 | | |
| EP | 0973349 A2 | 1/2000 | | |
| WO | WO-2011116849 A1 * | 9/2011 | | H04W 68/02 |
| WO | 2016157821 A1 | 10/2016 | | |

* cited by examiner

PAGING PROCESSING METHOD AND APPARATUS

CROSS-REFERENCE TO RELATED APPLICATION

This application is a national stage of International Application No. PCT/CN2017/081245 filed on Apr. 20, 2017, the disclosure of which is hereby incorporated by reference in its entirety.

TECHNICAL FIELD

The present disclosure relates to the field of communications, and in particular, to a paging processing method and apparatus.

BACKGROUND

Standardization related to 5G, that is, the NR (New Radio) network, is being carried out in 3GPP (3rd Generation Partnership Project). In the 5G system, in order to save the power of the terminal, the MTC (Machine-Type Communication) terminal operates in accordance with DRX (Discontinuous Reception). When the MTC terminal reaches the DRX activated period, it receives the paging indication sent by the network side for the MTC terminal, and the MTC terminal immediately initiates the paging response.

However, for the network side, it means that there will be a large number of MTC terminals initiating paging responses at the same time, thus causing network congestion.

SUMMARY

To overcome the problems in the related art, the embodiments of the present disclosure provide a paging processing method and apparatus.

According to a first aspect of the embodiments of the present disclosure, there is provided a paging processing method applied to a Machine-Type Communication (MTC) terminal, the method including:

determining a time-delay value of delaying a paging response according to a paging indication sent by a network side, the paging indication being indicative of presence of a paging to the MTC terminal;

determining a target time point for performing the paging response according to the time-delay value; and performing the paging response at the target time point.

Optionally, the method further includes:

sending to the network side, when the MTC terminal performs network registration, a terminal capability parameter indicating capability of the MTC terminal to support delaying the paging response, causing the network side to allow, after determining that the MTC terminal supports delaying the paging response according to the terminal capability parameter, the MTC terminal to perform the paging response at the target time point.

Optionally, the determining a time-delay value of delaying a paging response includes:

determining a value randomly within a preset time-delay range as the time-delay value of delaying the paging response.

Optionally, the time-delay value is a number of subframes, and the determining a target time point for performing the paging response according to the time-delay value includes:

determining a time point for sending a target subframe in uplink data as the target time point for performing the paging response, wherein the time-delay value is a difference between a subframe number of the target subframe and a subframe number of a subframe in downlink data carrying the paging indication.

Optionally, the performing the paging response includes:

sending an access request for accessing the network side;

receiving a paging message corresponding to the MTC terminal sent by the network side, after the network side allows the MTC terminal to access the network side based on the access request; and sending a paging response message to the network side according to the paging message.

Optionally, when sending the access request for accessing the network side, the method further includes:

sending the time-delay value to the network side, causing the network side to determine the paging message corresponding to the MTC terminal according to the time-delay value and a terminal identifier of the MTC terminal.

According to a second aspect of the embodiments of the present disclosure, there is provided a paging processing method applied to a network side, the method includes:

sending a paging indication corresponding to a Machine-Type Communication (MTC) terminal to the MTC terminal, the paging indication being indicative of presence of a paging to the MTC terminal;

allowing, after determining that the MTC terminal supports delaying a paging response, the MTC terminal to perform the paging response at a target time point, the target time point being a time point for performing paging response determined by the MTC terminal according to a time-delay value of delaying the paging response after receiving the paging indication.

Optionally, the determining that the MTC terminal supports delaying a paging response includes:

determining that the MTC terminal supports delaying the paging response when receiving a terminal capability parameter indicating capability of the MTC terminal to support delaying the paging response.

Optionally, the method further includes:

allowing, after receiving an access request sent by the MTC terminal for accessing the network side, the MTC terminal to access the network side;

sending, after the MTC terminal accesses the network side, a paging message corresponding to the MTC terminal to the MTC terminal; and receiving a paging response message sent by the MTC terminal according to the paging message.

Optionally, the paging message corresponding to the MTC terminal is determined by:

receiving the time-delay value sent by the MTC terminal when sending the access request; and searching for the paging message corresponding to the MTC terminal from all received paging messages according to the time-delay value and a terminal identifier of the MTC terminal.

According to a third aspect of the embodiments of the present disclosure, there is provided a paging processing apparatus applied to a Machine-Type Communication (MTC) terminal, the apparatus including:

a time-delay value determining module configured to determine a time-delay value of delaying a paging response according to a paging indication sent by a network side, the paging indication being indicative of presence of a paging to the MTC terminal;

a time point determining module configured to determine a target time point for performing the paging response according to the time-delay value; and a first execution module configured to perform the paging response at the target time point.

Optionally, the apparatus further includes:

a first sending module configured to send to the network side, when the MTC terminal performs network registration, a terminal capability parameter indicating capability of the MTC terminal to support delaying the paging response, causing the network side to allow, after determining that the MTC terminal supports delaying the paging response according to the terminal capability parameter, the MTC terminal to perform the paging response at the target time point.

Optionally, the time-delay value determining module includes:

a first determining submodule configured to randomly determine a value within a preset time-delay range as the time-delay value of delaying the paging response.

Optionally, the time-delay value is a number of subframes, the time point determining module includes:

a second determining submodule configured to determine a time point for sending a target subframe in uplink data as the target time point for performing the paging response, wherein the time-delay value is a difference between a subframe number of the target subframe and a subframe number of a subframe in downlink data carrying the paging indication.

Optionally, the first execution module including:

a first sending submodule configured to send an access request for accessing the network side;

a first receiving submodule configured to receive a paging message corresponding to the MTC terminal sent by the network side, after the network side allows the MTC terminal to access the network side based on the access request; and a second sending submodule configured to send a paging response message to the network side according to the paging message.

Optionally, the apparatus further including:

a second sending module configured to send the time-delay value to the network side, causing the network side to determine the paging message corresponding to the MTC terminal according to the time-delay value and the terminal identifier of the MTC terminal.

According to a fourth aspect of the embodiments of the present disclosure, there is provided a paging processing apparatus applied to a network side, the apparatus including:

a third sending module configured to send a paging indication corresponding to a Machine-Type Communication (MTC) terminal to the MTC terminal, the paging indication being indicative of presence of a paging to the MTC terminal;

a second execution module configured to allow, after determining that the MTC terminal supports delaying a paging response, the MTC terminal to perform the paging response at a time point, the target time point being a time point for performing paging response determined by the MTC terminal according to a time-delay value of delaying the paging response after receiving the paging indication.

Optionally, the second execution module including:

a third determining submodule configured to determine that the MTC terminal supports delaying the paging response when receiving a terminal capability parameter indicating capability of the MTC terminal to support delaying the paging response.

Optionally, the apparatus further including:

a third execution module configured to allow the MTC terminal to access the network side after receiving an access request sent by the MTC terminal for accessing the network side;

a fourth sending module configured to send a paging message corresponding to the MTC terminal to the MTC terminal after the MTC terminal accesses the network side; and a receiving module configured to receive a paging response message sent by the MTC terminal according to the paging message.

Optionally, the fourth sending module including:

a second receiving submodule configured to receive the time-delay value sent by the MTC terminal when sending the access request; and a searching submodule configured to search for the paging message corresponding to the MTC terminal from all received paging messages according to the time-delay value and a terminal identifier of the MTC terminal.

According to a fifth aspect of the embodiments of the present disclosure, there is provided a computer readable storage medium storing a computer program for performing the paging processing method according to the first aspect described above.

According to a sixth aspect of the embodiments of the present disclosure, there is provided a computer readable storage medium storing the computer program for performing the paging processing method according to the second aspect described above.

According to a seventh aspect of the embodiments of the present disclosure, there is provided a paging processing apparatus, including:

a processor;

a memory configured to store instructions executable by the processor;

wherein the processor is configured to perform the paging processing method according to the first aspect described above.

According to an eighth aspect of the embodiments of the present disclosure, there is provided a paging processing apparatus, including:

a processor;

a memory configured to store instructions executable by the processor;

wherein the processor is configured to perform the paging processing method according to the second aspect described above.

The technical solutions provided by the embodiments of the present disclosure may include the following beneficial effects.

In the embodiments of the present disclosure, when the MTC terminal determines that there is currently the paging to itself according to the paging indication sent by the network side, it is not necessary to immediately initiate the paging response. The MTC terminal may first determine the time-delay value for delaying the paging response, and determine the target time point for performing the paging response according to the time-delay value, so that the paging response may be performed at the target time point. Through the above process, the MTC terminal may delay the paging response after receiving the paging indication, the possibility that a large number of MTC terminals initiate paging responses at the same time and, thus, causing network congestion, can be reduced and the performance of the 5G system can be improved.

In the embodiments of the present disclosure, when performing network registration, the MTC terminal may send to the network side the terminal capability parameter indicating the capability thereof to support delaying the paging response, and then the network side allows, according to the terminal capability parameter, the MTC terminal to perform paging response at the target time point, that is, allows the MTC terminal to delay the paging response. Through the above process, the MTC may send the terminal capability parameter to the network side based on its own insensitivity to time delay, so as to delay the paging response and reduce the possibility of network congestion.

In the embodiments of the present disclosure, when determining the time-delay value of delaying the paging response, the MTC terminal may randomly determine the delay value within the preset time-delay range. When a large number of MTC terminals use this way to determine the time-delay value, the network side can be further prevented from receiving a large number of paging responses at the same time, thereby improving the performance of the 5G system.

In the embodiments of the present disclosure, the MTC terminal may send the determined time-delay value for delaying the paging response to the network side, and the network side may send to the MTC terminal, according to the time-delay value and the terminal identifier of the MTC terminal, the paging indication corresponding to the MTC terminal, so as to ensure that the MTC terminal can delay the paging response.

In the embodiments of the present disclosure, after sending to the MTC terminal the paging indication corresponding to the MTC terminal, the network side may allow the MTC terminal to perform paging response at the target time point if it is determined that the MTC terminal supports delaying the paging response. The target time point is the time point determined by the MTC terminal according to the time-delay value of delaying the paging response. Through the above process, the possibility that a large number of MTC terminals initiate paging responses at the same time and, thus, causing network congestion, can be reduced, and the performance of the 5G system can be improved.

In the embodiments of the present disclosure, according to the time-delay value sent by the MTC terminal and the terminal identifier of the MTC terminal, the network side may retrieve the paging message corresponding to the MTC terminal from all the received paging messages, and send the paging message to the MTC terminal, causing the MTC terminal to send the paging response message to the network side based on the paging message. Through the above process, it can be ensured that when the MTC terminal delays accessing the network, the network side can retrieve the corresponding paging message and send it to the MTC terminal, ensuring that the MTC terminal can delay the paging response.

It will be understood that the above general description and the following detailed description are intended to be illustrative and explanatory, and are not intended to limit the present disclosure.

BRIEF DESCRIPTION OF THE DRAWINGS

The attached drawings herein are incorporated into the specification and form part of the specification, showing embodiments consistent with the disclosure and used together with the specification to explain the principles of the invention.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the present disclosure as detailed in the appended claims.

The terminology used in this disclosure is for the purpose of describing particular embodiments only and is not intended to be limiting of the present disclosure. The singular forms "a", "the" and "said" used in this disclosure and the appended claims are also intended to include plural forms, unless the context clearly indicates otherwise. It will be further understood that the term "and/or" used herein comprises any or all possible combinations of one or more of the associated listed items.

It will be understood that, although the terms "first", "second", "third" and so on may be used to describe various kinds of information in this disclosure, such information should not be limited by these terms. These terms are used only to distinguish the same type of information from each other. For example, without departing from the scope of the present disclosure, the first information may also be referred to as the second information, similarly, the second information may also be termed as the first information. Depending on the context, the word "if" used herein can be interpreted as "upon . . . ", "when . . . " or "in response to determining . . . "

Figure 1:
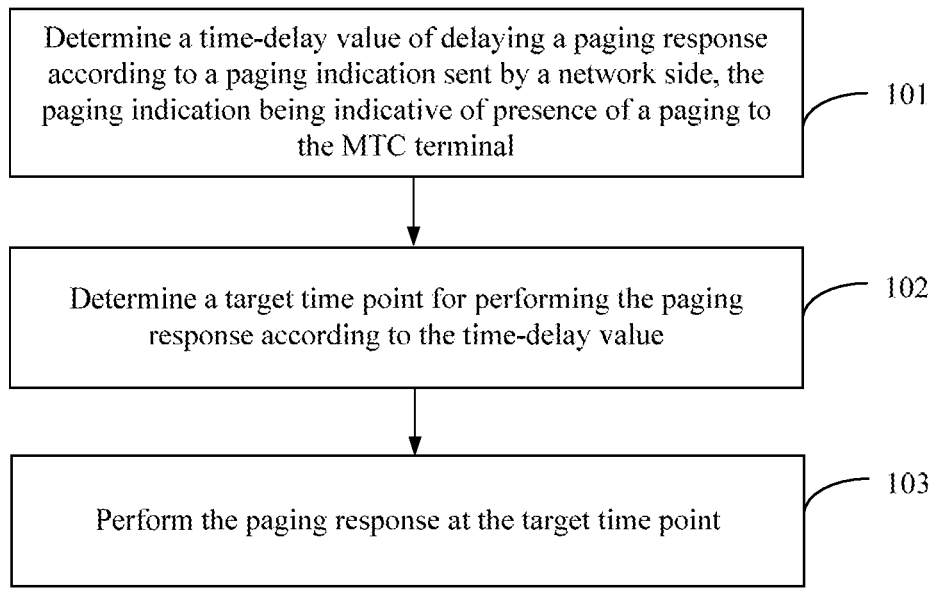
FIG. 1 is a flowchart illustrating a paging processing method according to an exemplary embodiment.

The present disclosure provides a paging processing method which may be applied to MTC terminals, such as smart meters, MTC monitoring, vending machines, etc. Referring to FIG. 1, a flow chart of a paging processing method illustrated in accordance with exemplary embodiments may include the following steps.

In step 101, a time-delay value of delaying a paging response is determined according to a paging indication sent by a network side, the paging indication being indicative of presence of a paging to the MTC terminal.

In step 102, a target time point for performing the paging response is determined according to the time-delay value.

In step 103, the paging response is performed at the target time point.

In the above embodiments, the MTC terminal may delay the paging response after receiving the paging indication, so as to reduce the possibility of network congestion caused by a large number of MTC terminals initiating paging responses at the same time, and improve the performance of 5G system.

For step 101 above, in order to save power of the terminal, the MTC terminal may work in accordance with DRX period. For example, in a DRX sleep period, the MTC terminal may not listen to PDCCH (Physical Downlink Control Channel) or receive downlink data; in a DRX activated period, the MTC terminal may maintain monitoring of PDCCH and receive downlink data.

In this step, when the MTC terminal enters the DRX activated period, it begins to monitor whether there is the paging indication indicating the presence of paging to the MTC terminal. When the MTC terminal receives the paging indication, indicating that the MTC terminal receives paging to itself during the DRX sleep period from the network side, which may be a core network. In this case, the MTC terminal may not need to initiate the paging response immediately, but may firstly determine the time-delay value of delaying paging response.

In embodiments of the present disclosure, the MTC terminal may determine the time-delay value within a preset time-delay range. For example, the preset time-delay range is [T1, T2], the MTC terminal may randomly select a value within the range as the time-delay value.

Optionally, the time-delay value may be represented by the number of subframes, and the preset time-delay range may be [1, N], where N is a positive integer greater than 1, for example, 1000. When the MTC terminal determines the time-delay value, it can randomly determine a positive integer as the time-delay value within the range of [1, N].

For step 102 above, when determining the target time point for paging response according to the time-delay value, timing may be started upon reception of the paging indication, and the target time point is a time point at which a timing duration reaches the time-delay value.

Optionally, when the time-delay value is the number of subframes, the time point at which the target subframe in uplink data is transmitted may be regarded as the target time point for paging response, wherein the time-delay value is the difference between the subframe number of the target subframe and the subframe number of the subframe carrying the paging indication in the downlink data.

Figure 2:
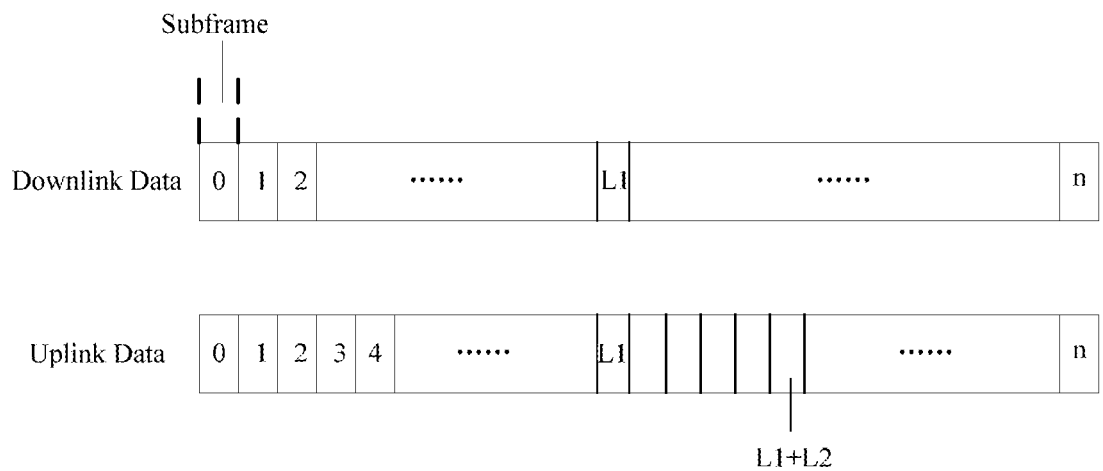
FIG. 2 is a scene diagram of a paging processing according to an exemplary embodiment.

For example, as shown in FIG. 2, assuming that the MTC terminal receives the paging indication in a subframe with a subframe number $L_1$ in the received downlink data, and the time-delay value is $L_2$ subframes, when the MTC terminal sends the uplink data, the target subframe is a subframe with a subframe number $L_1+L_2$, and the target time point is the time point at which the target subframe is transmitted.

For step 103 above, the MTC terminal may not start paging response until the target time point, at which the delayed paging response is performed, is reached.

Figure 3:
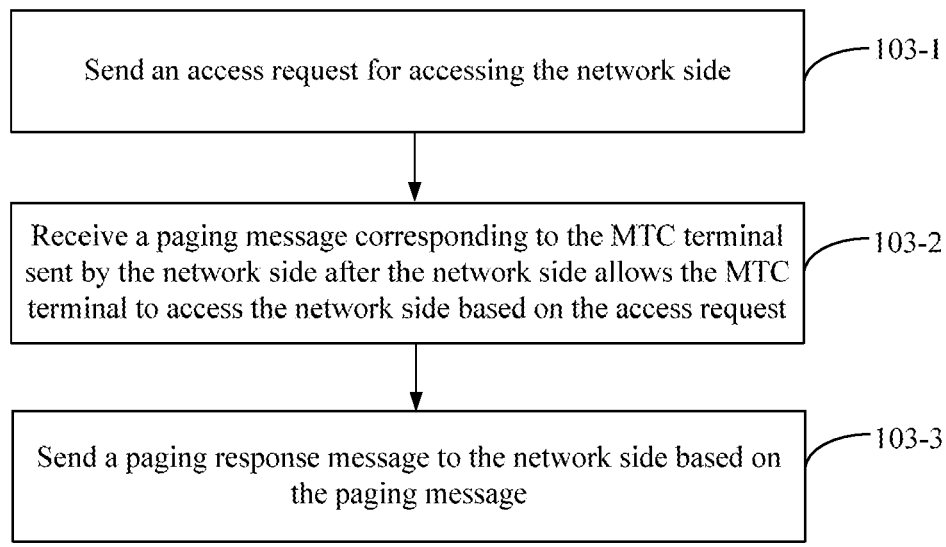
FIG. 3 is flowchart illustrating another paging processing method according to an exemplary embodiment.

Optionally, the process of paging response in step 103 may refer to FIG. 3, which is a flow chart of another paging processing method illustrated on the basis of the embodiment shown in FIG. 1, and may include following steps.

In step 103-1, an access request for accessing the network side is sent.

In this step, the MTC terminal may access the network side only when the target time point is reached, rather than upon receiving the paging indication. The MTC terminal may initiate the access request to the network side. Based on the access request, the network side may allow, after the MTC terminal has been authenticated according to related art, the MTC terminal to access the network side, that is, associates an access point with the MTC terminal, enabling the MTC terminal to access the network side.

In step 103-2, a paging message corresponding to the MTC terminal sent by the network side is received after the network side allows the MTC terminal to access the network side based on the access request.

In embodiments of the present disclosure, after allowing the MTC terminal to access the network side, the network side may retrieve the paging message corresponding to the MTC terminal according to the time-delay value and a terminal identifier of the MTC terminal. The paging message may carry the terminal identifier of the MTC terminal to be paged, a system message change indication identifier, and ETWS (Earthquake and tsunami warning indication sign).

In this step, after retrieving the paging message, the network side may send the corresponding paging message to the MTC terminal, and then the MTC terminal may receive the paging message according to related art.

In step 103-3, a paging response message is sent to the network side based on the paging message.

In this step, the MTC terminal sends the paging response message to the network side based on the received paging message.

Through the above process, the MTC terminal achieves the paging response process. Subsequently, the MTC terminal can communicate with the network side normally until the communication is completed and the network releases the connection. At this point, the MTC terminal may enter the DRX sleep period again.

In the above embodiment, the MTC terminal may not need to initiate the paging response immediately when it determines that there is the paging response to itself according to the paging indications sent by the network side. Instead, the MTC terminal may firstly determine the time-delay value for delaying the paging response, and then determine the target time point for performing the paging response according to the time-delay value, so that the paging response may be carried out only when the target time point is reached. It reduces the possibility of network congestion caused by a large number of MTC terminals initiating paging responses at the same time, and improves the performance of 5G system.

Figure 4:
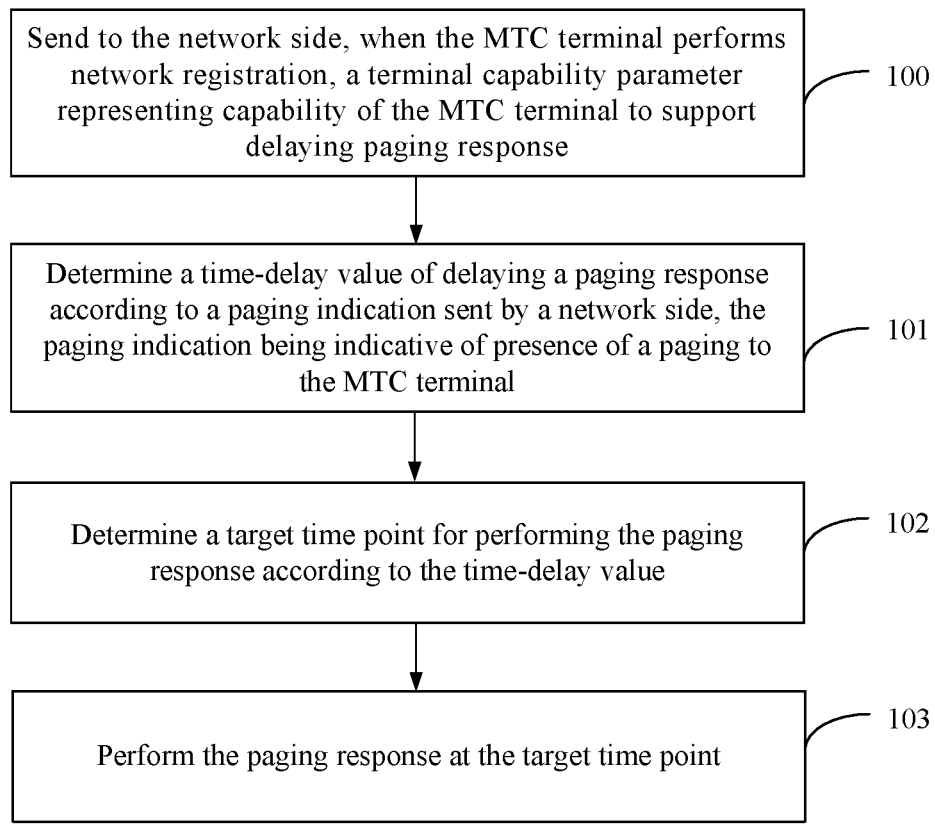
FIG. 4 is another flowchart illustrating a paging processing method according to an exemplary embodiment.

In an embodiment, the paging processing method described above may refer to FIG. 4, which is a flow chart of another paging processing method illustrated on the basis of the embodiments shown in FIG. 1, and may also include following steps.

In step 100, when performing network registration, the MTC terminal sends to the network side a terminal capability parameter indicating capability of the MTC terminal to support delaying paging response, causing the network side to allow, after determining that MTC terminal supports delaying paging response according to the terminal capability parameter, the MTC terminal to perform the paging response at the target time point.

In this step, the MTC terminal may define a terminal capability parameter used for indicating its own capability of supporting delaying paging response. The MTC terminal may send the terminal capability parameter to the network side while performing network registration, for example, while sending RRC (Radio Resource Control) connection request to the network side.

After receiving the terminal capability parameter, the network side may record the terminal capability parameter, so as to allow, after sending paging indication to the MTC terminal, the MTC terminal delay the paging response, that is, to allow the MTC terminal to perform the paging response when target time point is reached.

In the embodiments of the present disclosure, when performing network registration, the MTC terminal may send to the network side the terminal capability parameter indicating the capability of the MTC terminal to support delaying the paging response, causing the network side to allow, according to the terminal capability parameter, the MTC terminal to perform paging response at the target time point, that is, allow the MTC terminal to delay the paging response. Through the above process, the MTC may send the terminal capability parameter to the network side based on its own insensitivity to time delay, so as to delay the paging response and, thus, reduce the possibility of network congestion.

Figure 5:
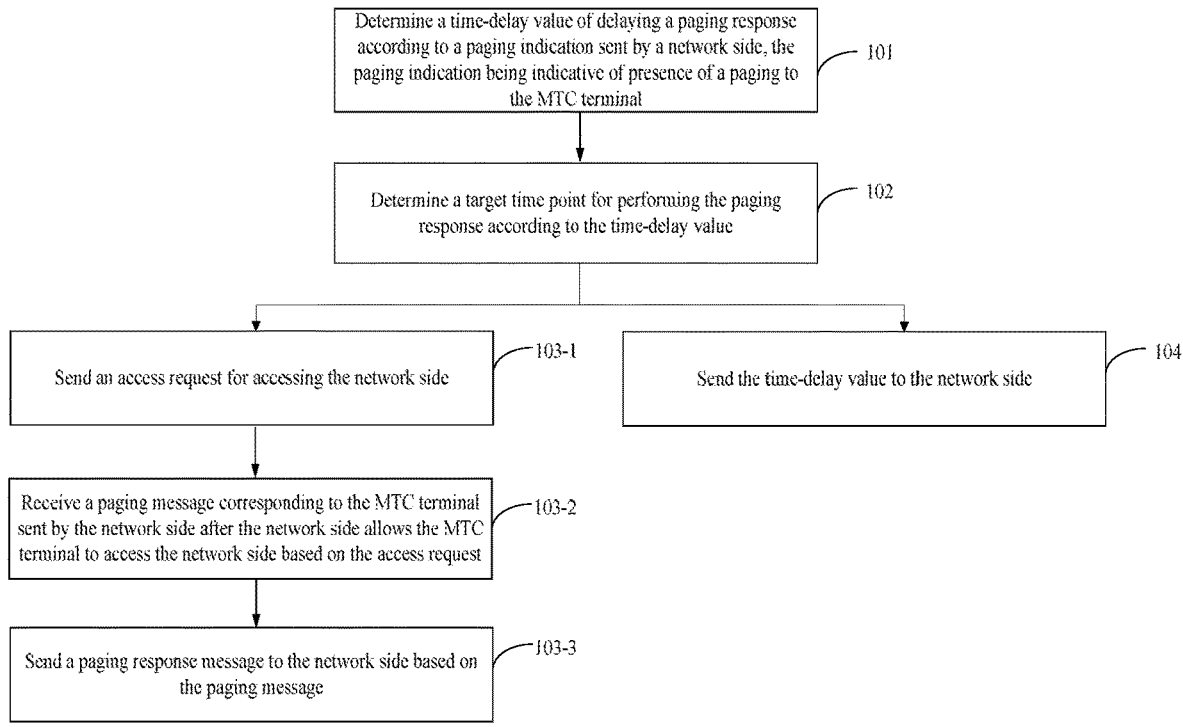
FIG. 5 is another flowchart illustrating a paging processing method according to an exemplary embodiment.

In an embodiment, the paging processing method described above may refer to FIG. 5, which is a flow chart of another paging processing method illustrated on the basis of the embodiments shown in FIG. 3. When step 103-1 is performed, it may also include following steps.

In step 104, the time-delay value is sent to the network side, causing the network side to determine the paging message corresponding to the MTC terminal according to the delay value and the terminal identifier of the MTC terminal.

In this step, the MTC terminal may send the time-delay value to the network side while sending the access request. After receiving them, the network side may retrieve, according to the time-delay value and the terminal identifier of the MTC terminal, the paging message corresponding to the MTC terminal from a plurality of received paging messages, so as to send the paging message to the MTC terminal.

In the above embodiment, the MTC terminal may send the determined time-delay value of delaying the paging response to the network side, thus the network side may retrieve, according to the time-delay value and the terminal identifier of the MTC terminal, the paging indications corresponding to the MTC terminal and send the same to the MTC terminal, ensuring that the MTC terminal can delay the paging response.

Figure 6:
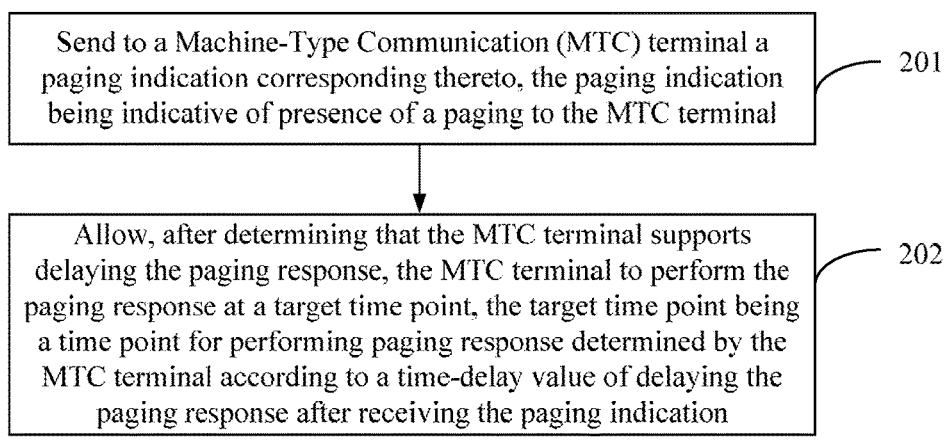
FIG. 6 is flowchart illustrating another paging processing method according to an exemplary embodiment.

The disclosure also provides another paging processing method, which may be applied to the network side, which may be the core network. FIG. 6 is a flowchart illustrating another paging processing method according to an exemplary embodiment, which may include the following steps.

In step 201, a paging indication corresponding to the Machine-Type Communication (MTC) terminal is sent to the MTC terminal, the paging indication being indicative of presence of a paging to the MTC terminal;

In step 202, after determining that the MTC terminal supports delaying the paging response, the MTC terminal is allowed to perform the paging response at a target time point, the target time point being a time point for performing paging response determined by the MTC terminal according to a time-delay value of delaying the paging response after receiving the paging indication.

In the above embodiment, after the network side sends to the MTC terminal the paging indication corresponding to the MTC terminal, the MTC terminal is allowed to perform paging response at the target time point if it is determined that the MTC terminal supports delaying the paging response. The target time point is the time point determined by the MTC terminal according to the time-delay value of delaying the paging response. Through the above process, the possibility of network congestion caused by a large number of MTC terminals initiating paging responses at the same time is reduced, and the performance of the 5G system is improved.

For the above step 201, the network side may send the paging indication to the MTC terminal after receiving the paging message for the MTC terminal, where the paging indication is indicative of presence of the paging to the MTC terminal. The MTC terminal may automatically receive the paging indication when it enters the DRX activated period.

For the above step 202, the network side may allow the MTC terminal to perform the paging response at the target time point, when determining that the MTC terminal supports delaying the paging response, where the target time point is the time point for performing paging response determined by the MTC terminal according to the time-delay value of delaying the paging response after receiving the paging indication. That is, the network side may allow the MTC terminal to access the network side to perform the paging response at the target time point.

In an embodiment, the MTC terminal may randomly determine a value within as preset time-delay range as the time-delay value. Optionally, the time-delay value may also be the number of subframes.

When receiving from the MTC terminal a terminal capability parameter indicating the capability of the MTC terminal to support delaying the paging response, the network side may determine that the MTC terminal supports delaying the paging response. Further, the network side may record the terminal capability parameter, so as to subsequently allow the MTC terminal to delay the paging response.

In an embodiment, the paging processing method described above may refer to FIG. 7, which is a flow chart of another paging processing method illustrated on the basis of the embodiments shown in FIG. 6, and may also include following steps.

In step 203, after receiving an access request sent by the MTC terminal for accessing the network side, the MTC terminal is allowed to access the network side.

In embodiments of the present disclosure, when the MTC terminal delays paging response, it may send to the network side the access request for requesting access to the network side at the target time point, and the network side may receive the access request directly according to the related art.

After receiving the access request, the network side may perform authentication on the MTC terminal according to the related art. After the authentication succeeds, an AP (ACCESS POINT) is associated with the MTC terminal, and the MTC terminal accesses the network side.

In step 204, a paging message corresponding to the MTC terminal is sent to the MTC terminal after the MTC terminal accesses the network side.

In this step, the network side may send the corresponding paging message to the MTC terminal after the MTC terminal accesses the network side. Optionally, the network side may send the paging message to the MTC terminal through Physical Downlink Shared Channel (PDSCH).

In step 205, a paging response message sent by the MTC terminal according to the paging message is received.

In this step, the MTC terminal sends the paging response message to the network side after receiving the paging message. The network side may directly receive the message according to related art.

In this way, the MTC terminal and the network side may communicate normally until the communication is completed, then the network may release the connection, and the MTC terminal may enter the DRX dormant period.

In the above embodiment, the network side may ensure that the MTC terminal can complete the paging response at the target time point by interacting with the MTC terminal. Thus, the possibility network congestion caused by a large number of MTC terminals initiating paging responses at the same time is reduced, and the performance of the 5G system is improved.

Figure 7:
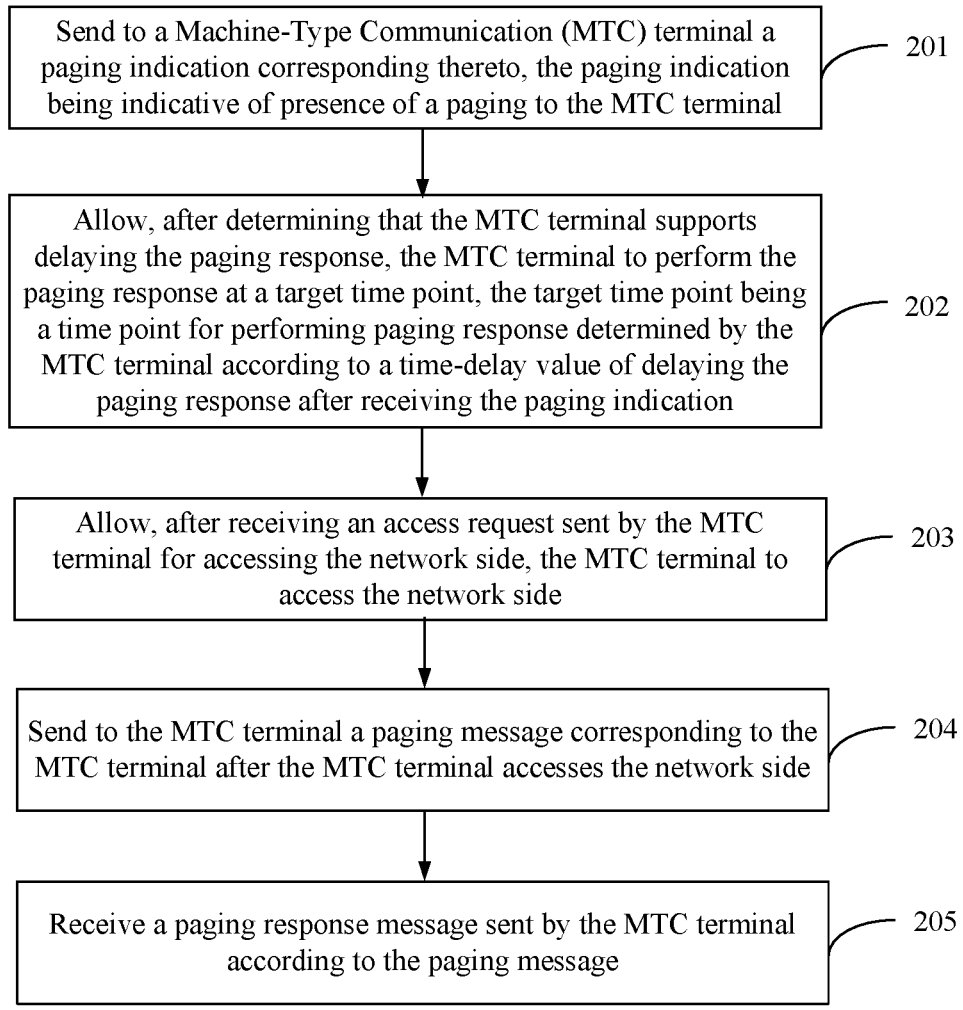
FIG. 7 is flowchart illustrating another paging processing method according to an exemplary embodiment.
Figure 8:
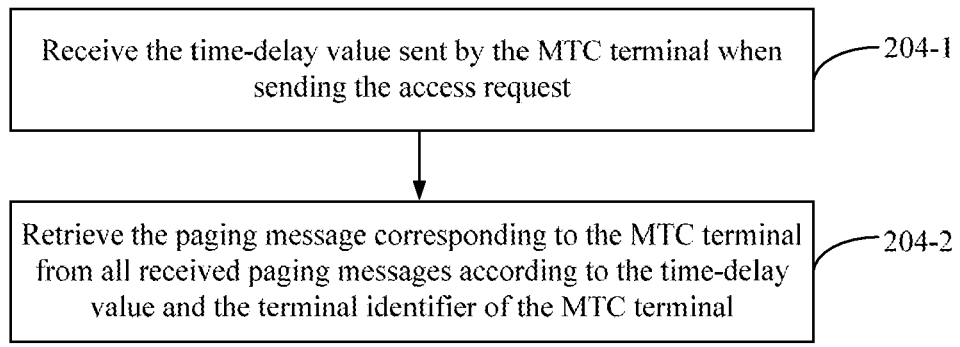
FIG. 8 is flowchart illustrating another paging processing method according to an exemplary embodiment.

In an embodiment, the above step 204 may refer to FIG. 8, which is a flowchart of another paging processing method illustrated on the basis of the embodiment shown in FIG. 7, and may include following steps.

In step 204-1, the time-delay value sent by the MTC terminal when sending the access request is received.

In this step, when the MTC terminal sends the access request for accessing the network side, the determined time-delay value may be simultaneously sent to the network side, and the network side may directly receive the same.

In step 204-2, the paging message corresponding to the MTC terminal is retrieved from all received paging messages according to the time-delay value and the terminal identifier of the MTC terminal.

In this step, according to the related art, the paging message may carry the terminal identifier of the MTC terminal to be paged, the system message change indication identifier, and the ETWS (Earthquake Tsunami Warning Indicator). In the embodiments of the present disclosure, since the MTC terminal delays performing the paging response, the network side may retrieve, based on the time-delay value and the terminal identifier, the paging message corresponding to the MTC terminal from all the received paging messages.

In the above embodiment, according to the time-delay value sent by the MTC terminal and the terminal identifier of the MTC terminal, the network side may retrieve the paging message corresponding to the MTC terminal from all the received paging messages, and send the paging message to the MTC terminal, causing the MTC terminal to send the paging response message to the network side based on the paging message. Through the above process, it can be ensured that, when the MTC terminal delays accessing the network, the network side can retrieve the corresponding paging message and send it to the MTC terminal, ensuring that the MTC terminal can delay the paging response.

Figure 9:
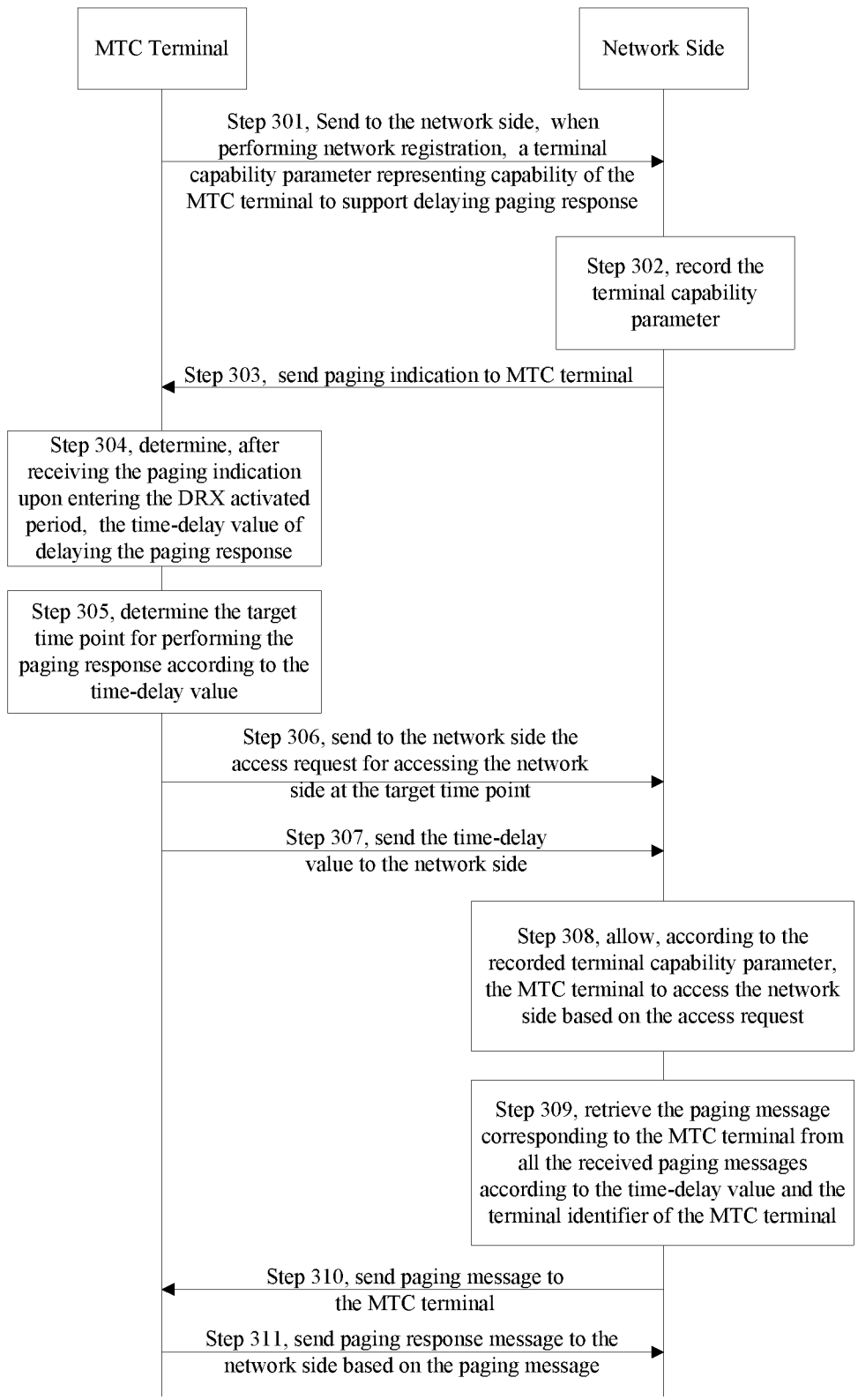
FIG. 9 is flowchart illustrating another paging processing method according to an exemplary embodiment.

The present disclosure further provides another paging processing method referring to FIG. 9, which is a flowchart of another paging processing method according to an embodiment, and the method may include following steps.

In step 301, when performing network registration, the MTC terminal may send to the network side the terminal capability parameter indicating the capability of MTC terminal to support delaying the paging response.

In step 302, the network side records the terminal capability parameter.

In step 303, the network side sends the paging indication to the MTC terminal, the paging indication being indicative of presence of a paging to the MTC terminal.

In step 304, after receiving the paging indication upon entering the DRX activated period, the MTC terminal determines the time-delay value of delaying the paging response.

In step 305, the MTC terminal determines the target time point for performing the paging response according to the time-delay value.

In step 306, the MTC terminal sends to the network side the access request for accessing the network side at the target time point.

In step 307, the MTC terminal sends the time-delay value to the network side.

The above steps 306 and 307 may be performed simultaneously.

In step 308, the network side allows, according to the recorded terminal capability parameter, the MTC terminal to access the network side based on the access request.

In step 309, the network side retrieves the paging message corresponding to the MTC terminal from all the received paging messages according to the time-delay value and the terminal identifier of the MTC terminal.

In step 310, the network side sends the paging message to the MTC terminal.

In step 311, the MTC terminal sends the paging response message to the network side based on the paging message.

Through the above process, the process of the MTC terminal delaying the paging response is completed. The possibility of network congestion caused by a large number of MTC terminals initiating paging responses at the same time is reduced, and the performance of the 5G system is improved.

As to the foregoing methods and embodiments, for the sake of brevity, they are all described as a series of combinations of actions, but those skilled in the art should understand that the present disclosure is not limited by the order of described actions, because according to the present disclosure, some steps can be performed in other orders or at the same time.

In addition, those skilled in the art should also understand that the embodiments described in the specification are optional embodiments, and the actions and modules involved are not necessarily required by the disclosure.

Corresponding to the above application function implementation method embodiments, the present disclosure also provides application function implementation apparatus and corresponding terminal embodiments.

Figure 10:
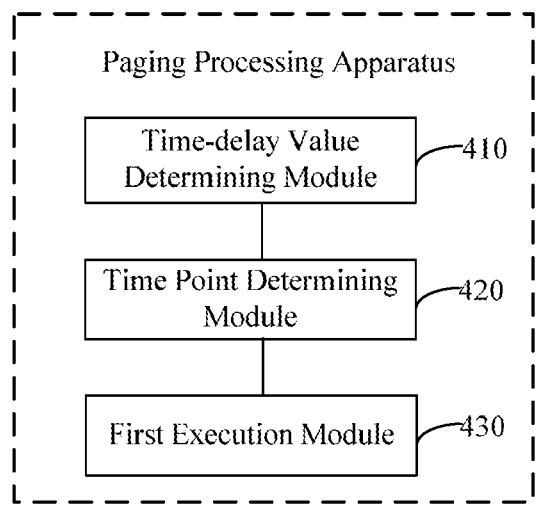
FIG. 10 is a block diagram illustrating a paging processing apparatus according to an exemplary embodiment.

Referring to FIG. 10, a block diagram illustrating a paging processing apparatus according to an exemplary embodiment, the apparatus is applied to a Machine-Type Communication (MTC) terminal and includes following modules.

Time-delay value determining module 410 is configured to determine a time-delay value of delaying a paging response according to a paging indication sent by a network side, the paging indication being indicative of presence of a paging to the MTC terminal.

Time point determining module 420 is configured to determine a target time point for performing the paging response according to the time-delay value.

First execution module 430 is configured to perform the paging response at the target time point.

Figure 11:
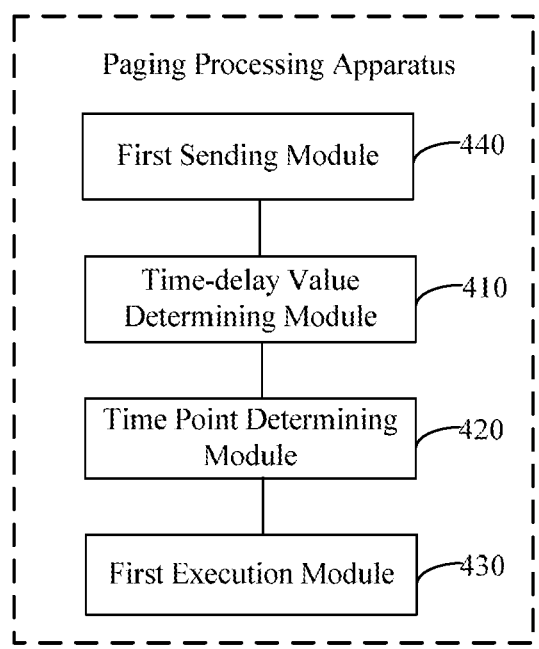
FIG. 11 is a block diagram illustrating another paging processing apparatus according to an exemplary embodiment.

Referring to FIG. 11, FIG. 11 is a block diagram illustrating another paging processing apparatus on the basis of the embodiment shown in FIG. 10, and the apparatus further includes following modules.

First sending module 440 is configured to send to the network side, when the MTC terminal performs network registration, a terminal capability parameter indicating capability of the MTC terminal to support delaying the paging response, causing the network side to allow, after determining that the MTC terminal supports delaying the paging response according to the terminal capability parameter, the MTC terminal to perform the paging response at the target time point.

Figure 12:
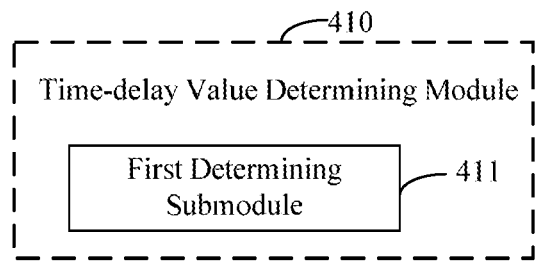
FIG. 12 is a block diagram illustrating another paging processing apparatus according to an exemplary embodiment.

Referring to FIG. 12, FIG. 12 is a block diagram illustrating another paging processing apparatus on the basis of the embodiment shown in FIG. 10. The time-delay value determining module 410 includes following submodules.

First determining submodule 411 is configured to randomly determine a value within a preset time-delay range as the time-delay value of delaying the paging response.

Optionally, the time-delay value is the number of subframes.

Figure 13:
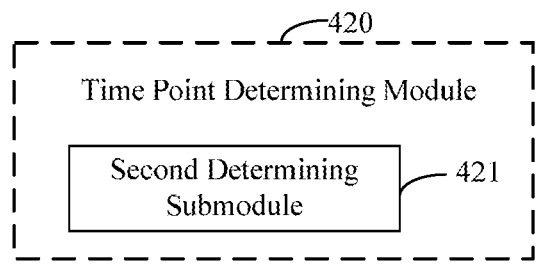
FIG. 13 is a block diagram illustrating another paging processing apparatus according to an exemplary embodiment.

Referring to FIG. 13, FIG. 13 is a block diagram illustrating another paging processing apparatus on the basis of the embodiment shown in FIG. 12. The time point determining module 420 includes following submodules.

Second determining submodule 421 is configured to determine a time point for sending a target subframe in uplink data as the target time point for performing the paging response, wherein the time-delay value is a difference between a subframe number of the target subframe and a subframe number of a subframe in downlink data carrying the paging indication.

Figure 14:
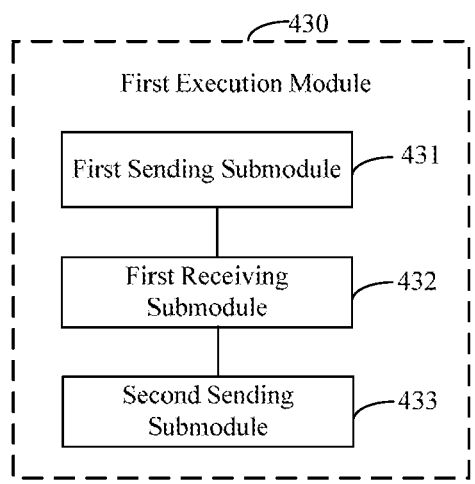
FIG. 14 is a block diagram illustrating another paging processing apparatus according to an exemplary embodiment.

Referring to FIG. 14, FIG. 14 is a block diagram illustrating another paging processing apparatus on the basis of the embodiment shown in FIG. 10. The first execution module 430 includes following submodules.

First sending submodule 431 is configured to send an access request for accessing the network side.

First receiving submodule 432 is configured to receive a paging message corresponding to the MTC terminal sent by the network side, after the network side allows the MTC terminal to access the network side according to the access request.

Second sending submodule 433 is configured to send a paging response message to the network side according to the paging message.

Figure 15:
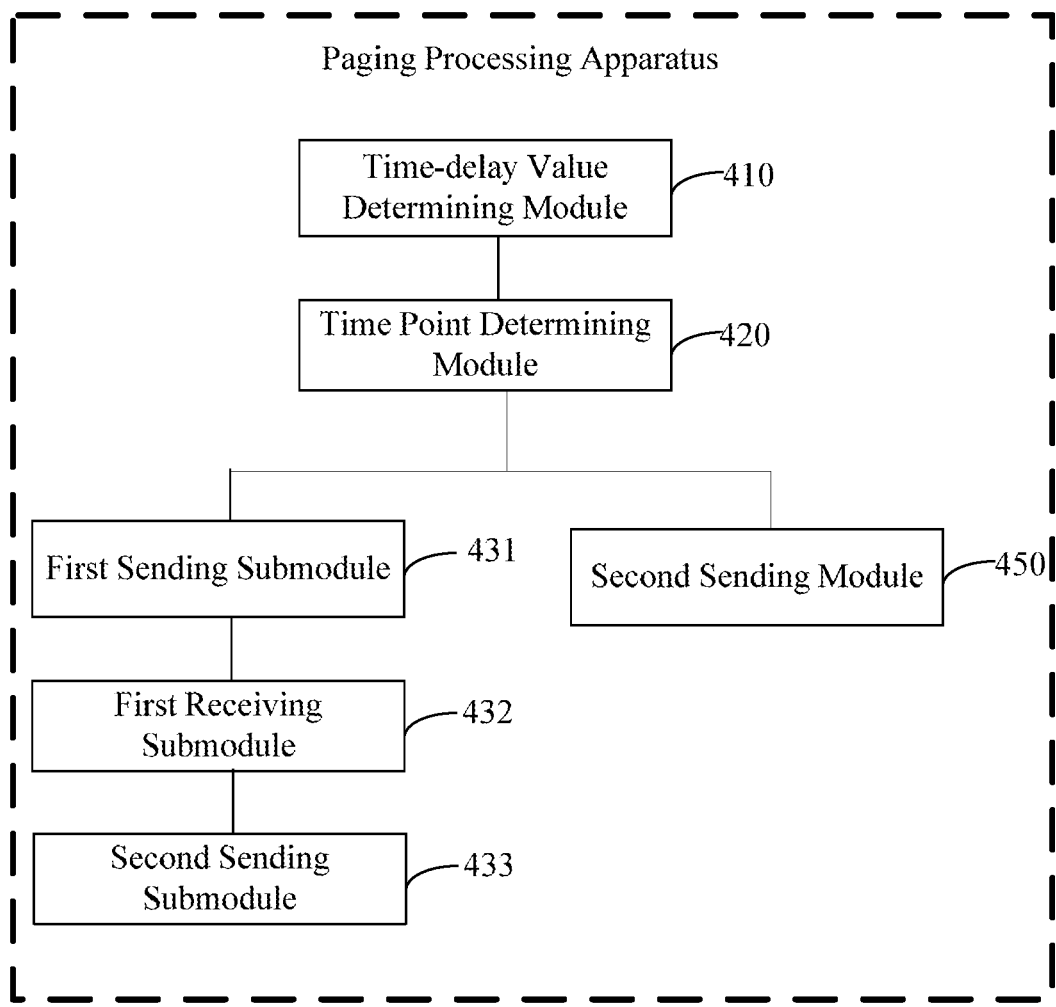
FIG. 15 is a block diagram illustrating another paging processing apparatus according to an exemplary embodiment.

Referring to FIG. 15, FIG. 15 is a block diagram illustrating another paging processing apparatus on the basis of the embodiment shown in FIG. 14, the apparatus further includes following modules.

Second sending module 450 is configured to send the time-delay value to the network side, causing the network side to determine the paging message corresponding to the MTC terminal according to the time-delay value and the terminal identifier of the MTC terminal.

Figure 16:
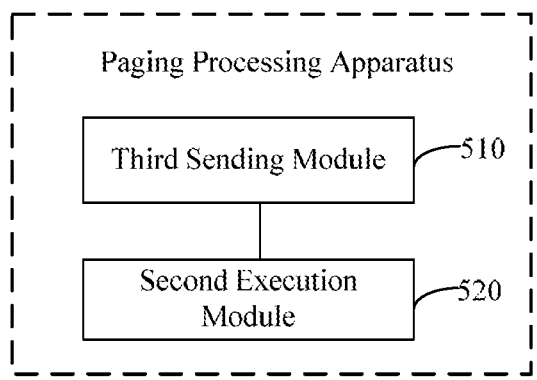
FIG. 16 is a block diagram illustrating another paging processing apparatus according to an exemplary embodiment.

FIG. 16 is a block diagram illustrating another paging processing apparatus according to an exemplary embodiment. The apparatus is applied to a network side and includes following modules.

Third sending module 510 is configured to send a paging indication corresponding to a Machine-Type Communication (MTC) terminal to the MTC terminal, the paging indication being indicative of presence of a paging to the MTC terminal.

Second execution module 520 is configured to allow, after determining that the MTC terminal supports delaying a paging response, the MTC terminal to perform the paging response at a time point, the target time point being a time point for performing paging response determined by the MTC terminal according to a time-delay value of delaying the paging response after receiving the paging indication.

Figure 17:
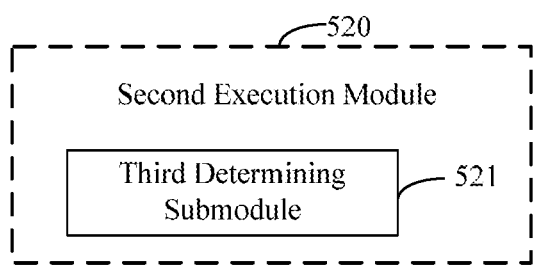
FIG. 17 is a block diagram illustrating another paging processing apparatus according to an exemplary embodiment.

Referring to FIG. 17, FIG. 17 is a block diagram illustrating another paging processing apparatus on the basis of the embodiment shown in FIG. 16, the second execution module 520 includes following submodules.

Third determining submodule 521 is configured to determine that the MTC terminal supports delaying the paging response when receiving a terminal capability parameter indicating capability of the MTC terminal to support delaying the paging response.

Figure 18:
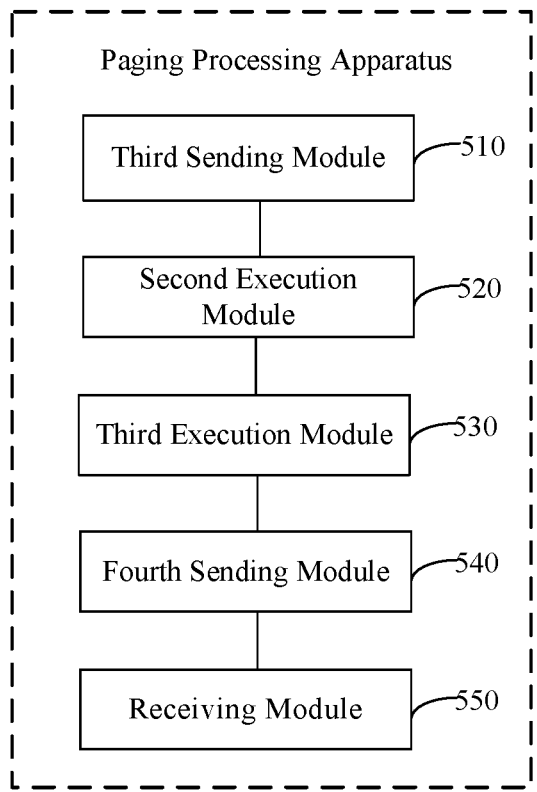
FIG. 18 is a block diagram illustrating another paging processing apparatus according to an exemplary embodiment.

Referring to FIG. 18, FIG. 18 is a block diagram illustrating another paging processing apparatus on the basis of the embodiment shown in FIG. 16, the apparatus further includes following modules.

Third execution module 530 is configured to allow the MTC terminal to access the network side after receiving an access request sent by the MTC terminal for accessing the network side.

Fourth sending module 540 is configured to send a paging message corresponding to the MTC terminal to the MTC terminal after the MTC terminal accesses the network side.

Receiving module 550 is configured to receive a paging response message sent by the MTC terminal according to the paging message.

Figure 19:
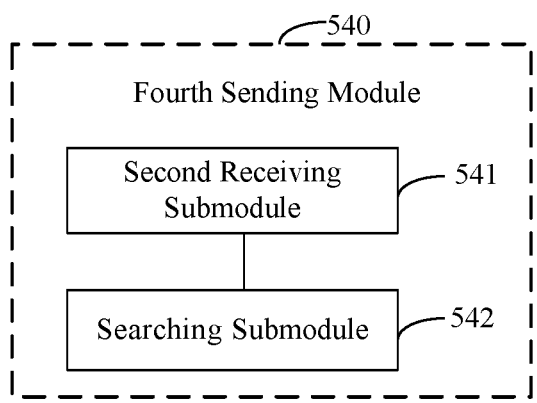
FIG. 19 is a block diagram illustrating another paging processing apparatus according to an exemplary embodiment.

Referring to FIG. 19, FIG. 19 is a block diagram illustrating another paging processing apparatus on the basis of the embodiment shown in FIG. 18. The fourth sending module 540 includes following submodules.

Second receiving submodule 541 is configured to receive the time-delay value sent by the MTC terminal when sending the access request.

Searching submodule 542 is configured to search for the paging message corresponding to the MTC terminal from all received paging messages according to the time-delay value and a terminal identifier of the MTC terminal.

For the embodiments of the apparatus, since it basically corresponds to the embodiments of the method, reference may be made to the partial description of the embodiments of the method. The embodiments of the apparatus described above are merely illustrative, wherein the units described as separate components may be or may not be physically separated, and the components displayed as units may be or may not be physical units. In other words, they may be located in one place, or distributed in multiple network elements. Some or all of the modules may be selected according to actual needs to achieve the objectives of the present disclosure. Those of ordinary skill in the art can understand and implement without any creative effort.

Correspondingly, an embodiment of the present disclosure further provides a computer readable storage medium storing a computer program for performing any of the above described paging processing methods for the MTC terminal.

Correspondingly, an embodiment of the present disclosure further provides a computer readable storage medium storing a computer program for performing any of the above described paging processing methods for the network side.

Correspondingly, an embodiment of the present disclosure further provides a paging processing apparatus, including:

a processor; and a memory configured to store instructions executable by the processor;

the processor is configured to perform any of the paging processing methods described above for the Machine Type Communication (MTC) terminal.

Figure 20:
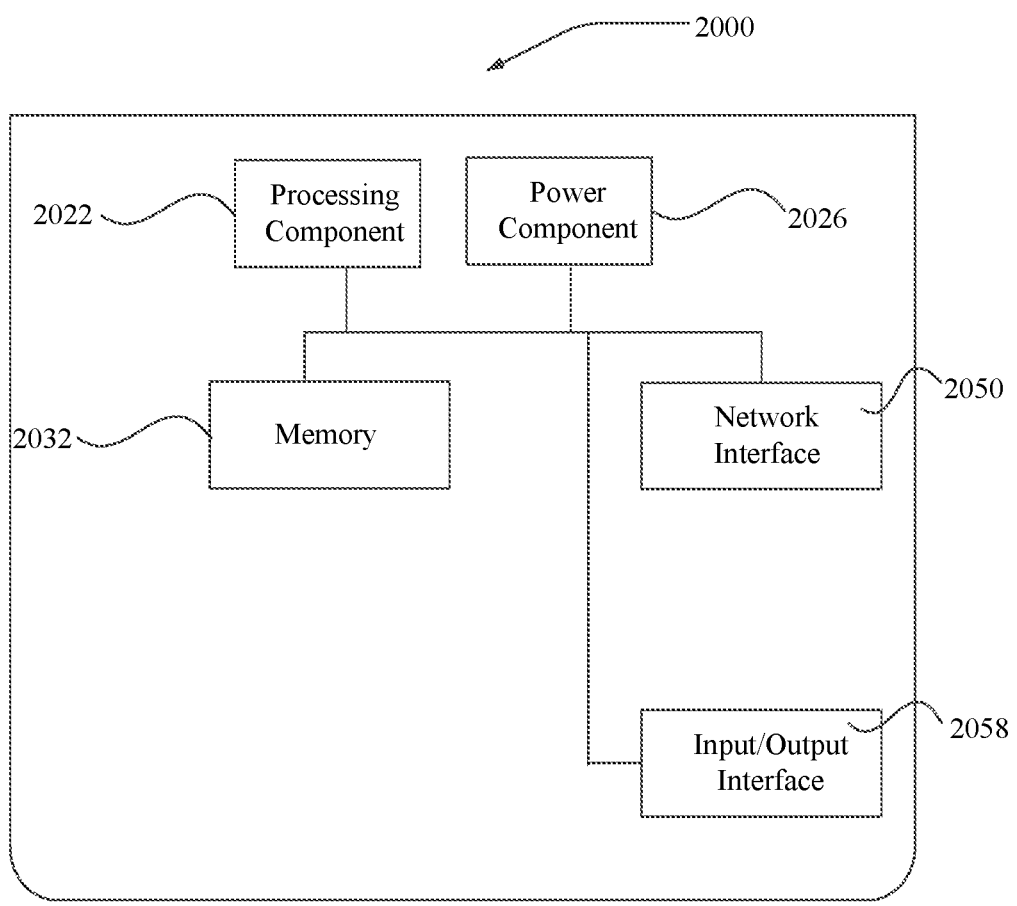
FIG. 20 is a schematic structural diagram illustrating a paging processing apparatus according to an exemplary embodiments of the present disclosure.

FIG. 20 is a schematic structural diagram illustrating a paging processing apparatus 2000 according to an exemplary embodiment. For example, the apparatus 2000 may be a Machine Type Communication terminal, and may be specifically a smart meter or the like.

Referring to FIG. 20, apparatus 2000 includes a processing component 2022 that further includes one or more processors, and memory resource represented by a memory 2032 for storing instructions executable by processing component 2022, such as an application. An application stored in memory 2032 may include one or more modules each corresponding to a set of instructions. Additionally, processing component 2022 is configured to execute instructions to perform the paging processing method described above.

Apparatus 2000 may also include a power supply component 2026 configured to perform power management of apparatus 2000, a wired or wireless network interface 2050 configured to connect apparatus 2000 to the network, and an input/output (I/O) interface 2058. The apparatus 2000 may operate based on the operating system stored in the memory 2032, such as Android, IOS, Windows Server™, Mac OS X™, Unix™ Linux™, FreeBSD™ or the like.

When the instructions in the memory 2032 are executed by the processing component 2022, the apparatus 2000 is enabled to perform any of the paging processing methods described above.

Correspondingly, an embodiment of the present disclosure further provides a paging processing apparatus, including:

a processor;

a memory configured to store instructions executable by the processor;

the processor is configured to perform any of the paging processing methods for the network side.

Figure 21:
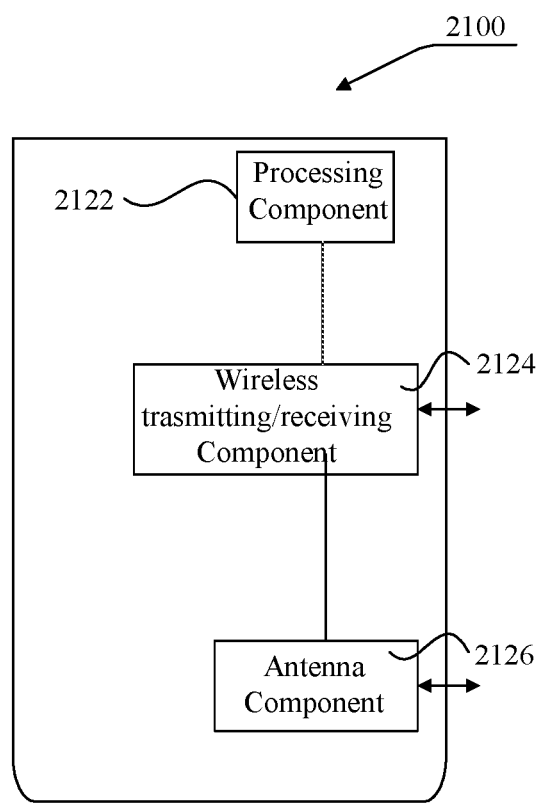
FIG. 21 is a schematic structural diagram illustrating a paging processing apparatus according to an exemplary embodiments of the present disclosure.

FIG. 21 is a schematic structural diagram illustrating a paging processing apparatus 2100 according to an exemplary embodiment. Apparatus 2100 may be provided as a network side. Referring to FIG. 21, apparatus 2100 comprises processing component 2122, wireless transmit/receive component 2124, antenna component 2126, and signal processing portion specific to the wireless interface. The processing component 2122 may further include one or more processors.

One of the processors in the processing component 2122 may be configured to perform any paging processing method used on the network side.

Other embodiments of the present disclosure will be readily apparent to those skilled in the art taking the present disclosure in consideration and implementation. The present application is intended to cover any variations, uses, or adaptations of the present disclosure, which are in accordance with the general principles of the disclosure and include common general knowledge or common technical means in the art that are not disclosed in the present disclosure. The specification and examples are to be regarded as illustrative only, and the true scope and spirit of the disclosure is pointed out by the following claims.

It should be understood that this disclosure is not limited to the exact structure described above and shown in the accompanying drawings, and can be subject to various modifications and changes without deviating from its scope. The scope of this disclosure is limited only by the attached claims.

The invention claimed is:

1. A paging processing method, comprising:

determining a time-delay value of delaying a paging response according to a paging indication sent by a network side, the paging indication being indicative of presence of a paging to a Machine-Type Communication (MTC) terminal;

determining a target time point for performing the paging response according to the time-delay value;

performing the paging response at the target time point; and sending terminal capability parameters to the network side based on an insensitivity to time delay of the MTC terminal, so as to delay the paging response and reduce a possibility of network congestion wherein the performing the paging response comprises:

sending an access request for accessing the network side;

receiving a paging message corresponding to the MTC terminal sent by the network side, after the network side allows the MTC terminal to access the network side based on the access request; and sending a paging response message to the network side according to the paging message;

wherein when sending the access request for accessing the network side, the method further comprises sending the time delay value to the network side, causing the network side to determine the paging message corresponding to the MTC terminal according to the time-delay value and a terminal identifier of the MTC terminal;

the method further comprising, upon the MTC terminal determining that there is currently the paging to the MTC terminal according to the paging indication sent by the network side, not immediately initiating the paging response;

the method further comprising delaying the paging response after receiving the paging indication, thereby reducing a possibility that a large number of MTC terminals initiate paging responses at a same time causing network congestion; and the method further comprising randomly determining a delay value within a preset time-delay range, to thereby further prevent the network side from receiving a large number of paging responses at a same time.

2. The method according to claim 1, wherein the method further comprises:

sending to the network side, when the MTC terminal performs network registration, a terminal capability parameter indicating capability of the MTC terminal to support delaying the paging response, causing the network side to allow, in response to determining that the MTC terminal supports delaying the paging response according to the terminal capability parameter, the MTC terminal to perform the paging response at the target time point.

3. The method according to claim 1, wherein the time-delay value is a number of subframes, and the determining a target time point for performing the paging response according to the time-delay value comprises:

determining a time point for sending a target subframe in uplink data as the target time point for performing the paging response, wherein the time-delay value is a difference between a subframe number of the target subframe and a subframe number of a subframe in downlink data carrying the paging indication.

4. A paging processing apparatus, comprising:

a processor; and a memory device configured to store instructions executable by the processor;

wherein the processor is configured to:

determine a time-delay value of delaying a paging response according to a paging indication sent by a network side, the paging indication being indicative of presence of a paging to a Machine-Type Communication (MTC) terminal;

determine a target time point for performing the paging response according to the time-delay value;

perform the paging response at the target time point; and instruct the MTC terminal to send terminal capability parameters to the network side based on an insensitivity to time delay of the MTC terminal, so as to delay the paging response and reduce a possibility of network congestion;

wherein the processor is configured to perform the paging response by:

sending an access request for accessing the network side;

receiving a paging message corresponding to the MTC terminal sent by the network side, after the network side allows the MTC terminal to access the network side based on the access request; and sending a paging response message to the network side according to the paging message;

wherein when sending the access request for accessing the network side, the processor is further configured to send the time delay value to the network side, causing the network side to determine the paging message corresponding to the MTC terminal according to the time-delay value and a terminal identifier of the MTC terminal;

wherein the processor is further configured to, upon the MTC terminal determining that there is currently the paging to the MTC terminal according to the paging indication sent by the network side, not immediately initiate the paging response;

wherein the processor is further configured to delay the paging response after receiving the paging indication, thereby reducing a possibility that a large number of MTC terminals initiate paging responses at a same time causing network congestion; and wherein the processor is further configured to randomly determine a delay value within a preset time-delay range, to thereby further prevent the network side from receiving a large number of paging responses at a same time.

5. The apparatus according to claim 4, wherein the processor is further configured to:

send to the network side, when the MTC terminal performs network registration, a terminal capability parameter indicating capability of the MTC terminal to support delaying the paging response, causing the network side to allow, in response to determining that the MTC terminal supports delaying the paging response according to the terminal capability parameter, the MTC terminal to perform the paging response at the target time point.

6. The apparatus according to claim 4, wherein the processor is configured to determine the time-delay value of delaying the paging response by:

determining a value randomly within a preset time-delay range as the time-delay value.

7. The apparatus according to claim 6, wherein the time-delay value is a number of subframes, and the processor is configured to determine the target time point for performing the paging response according to the time-delay value by:

determining a time point for sending a target subframe in uplink data as the target time point for performing the paging response, wherein the time-delay value is a difference between a subframe number of the target subframe and a subframe number of a subframe in downlink data carrying the paging indication.

* * * * *